US009654290B2

(12) United States Patent
Battistello et al.

(10) Patent No.: US 9,654,290 B2
(45) Date of Patent: May 16, 2017

(54) INTEGRITY VERIFICATION OF CRYPTOGRAPHIC KEY PAIRS

(71) Applicant: OBERTHUR TECHNOLOGIES, Colombes (FR)

(72) Inventors: Alberto Battistello, Colombes (FR); Christophe Giraud, Colombes (FR); Guillaume Dabosville, Colombes (FR); Laurie Genelle, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 4 days.

(21) Appl. No.: 14/572,318

(22) Filed: Dec. 16, 2014

(65) Prior Publication Data

US 2015/0172052 A1 Jun. 18, 2015

(30) Foreign Application Priority Data

Dec. 17, 2013 (FR) ..................... 13 62841

(51) Int. Cl.
*G06F 21/00* (2013.01)
*G06F 7/72* (2006.01)
*H04L 9/28* (2006.01)
*H04L 9/14* (2006.01)
*H04L 9/00* (2006.01)

(52) U.S. Cl.
CPC ............. *H04L 9/14* (2013.01); *H04L 9/002* (2013.01); *H04L 9/004* (2013.01); *H04L 2209/12* (2013.01); *H04L 2209/24* (2013.01)

(58) Field of Classification Search
CPC ..................................... H04L 9/302

USPC ...................................... 380/27, 30
See application file for complete search history.

(56) References Cited

U.S. PATENT DOCUMENTS

2013/0208886 A1\* 8/2013 Lee .................. H04L 9/28
380/28

FOREIGN PATENT DOCUMENTS

WO         98/35467 A1    8/1998

OTHER PUBLICATIONS

Donald L Evans et al: "FIPS Pub 140-2: Security Requirements for Cryptographic Modules", Federal Information Processing Standards Publication, Mar. 12, 2002 (Mar. 12, 2002), pp. i-61, XP055138700, Extrait de 1 | Internet: URL:http://csrc.nist.gov/publications/fips /fips140-2/fips1402.pdf [extrait le Sep. 8, 2014] * section 4.9.2.

(Continued)

*Primary Examiner* — Alexander Lagor
(74) *Attorney, Agent, or Firm* — Young & Thompson

(57) ABSTRACT

Method of integrity verification of public and private cryptographic key pairs in the additive group of integers modulo n, with n being the product of two prime numbers p and q, the method including the following steps:
- of computation (201), on the basis of the number n, of a public exponent e of the public key, and of a private exponent d of the private key, of two candidate factors p' and q' corresponding respectively to the numbers p and q,
- of verification (206) so as to verify the consistency of the private exponent with respect to the public exponent and to the number n, the verification step involving the candidate factors.

11 Claims, 2 Drawing Sheets

(56) References Cited

OTHER PUBLICATIONS

Dan Boneh: "Twenty Years of Attacks on the RSA Cryptosystem", Notices of the AMS, vol. 46, No. 2, Feb. 1, 1999 (Feb. 1, 1999), pp. 203-213, XP055076986, Extrait de l'Internet: URL:http://www.ams.org/notices/199902/bone h.pdf [extrait le Aug. 29, 2013] * Fact 1 *.

FR Search Report, dated Oct. 7, 2014, from corresponding FR application.

* cited by examiner

INTEGRITY VERIFICATION OF CRYPTOGRAPHIC KEY PAIRS

The present invention relates to the field of digital information security. It relates more particularly to the securing of cryptographic methods implementing public and private key pairs.

BACKGROUND OF THE INVENTION

Certain cryptographic systems implementing methods such as for example the digital signing of a message or its encryption, require the generation of cryptographic key pairs. The public key is shared as plaintext by the cryptographic system with the addressee systems receiving the processed message whereas the private key is kept secret.

Generation of public and private key pairs being a sensitive operation, test mechanisms are usually provided for verifying their integrity.

For example, the American FIPS standard 140-2 published by the NIST (the initials standing for "National Institute of Standards and Technology") provides for such a test (entitled "pair-wise consistency test").

In the case of cryptographic methods of RSA type (the initials standing for "Rivest Shamir Adelman"), the key pair is obtained in the following manner.

To obtain p and q, two large prime numbers, the following two steps are repeated:
  obtaining of two candidate numbers p and q on the basis of numbers drawn at random in the set $Z_n$, of the additive group of integers modulo n, and
  testing of the primality of the p and q candidates (for example according to a probabilistic primality test, for example of Miller-Rabin type, for example in accordance with FIPS standard 140-2,
until a prime number is obtained.

The product of the numbers p and q thus forms a number n (n=p·q).

Thereafter, the number $\Phi(n)=(p-1)\cdot(q-1)$ is computed ($\Phi$ being the Euler indicator function, or "totient" as it is termed).

The public key is thereafter formed by the numbers n and e, with e, "the public exponent", being an integer such that:
  $1<e<\Phi(n)$, and
  e and $\Phi$ (n) are mutually prime (gcd(e, $\Phi(n)$)=1, "gcd" being the initials standing for "greatest common divisor").

The private key, on the other hand, is formed by the numbers n and d, with d, "the private exponent", being an integer such that:
  $d \cdot e = 1 \mod \lambda(n)$, with
  $\lambda(n)$ being the least common multiple between p−1 and q−1 ($\lambda(n)=\text{lcm}(p-1, q-1)$, "lcm" being the initials standing for "least common multiplier").

When the cryptographic method is an encryption of a message m (m belonging to $Z_n$), the integrity test provided for by FIPS standard 140-2 can be summarized as follows:
1) the message m is encrypted with the public key so as to obtain an encrypted message $c=m^e \mod n$,
2) the encrypted message c is decrypted with the private key so as to obtain a decrypted message $m'=c^d \mod n$, and
3) it is verified that the initial message m and the decrypted message are the same (m'=m).

When the cryptographic method is a signing of a message m (m belonging to $Z_n$), the integrity test provided for by FIPS standard 140-2 can be summarized as follows:

1) the message m is signed with the private key so as to obtain a signature $s=(m)^d \mod n$, (or optionally $s=(H(m))^d$, H being a hash function,
2) a value h' is computed as $h'=s^e \mod n$, and
3) it is verified that the value h' thus computed and the message m are the same (or optionally that the value h' and the digest of the message under the hash function are the same (h'=H(m)).

SUMMARY OF THE INVENTION

The inventors have however noted that the integrity tests currently used might not detect certain errors when generating pairs of keys. They have thus highlighted a need to improve the reliability of the integrity verification methods for the generation of pairs of keys in cryptographic systems.

The present invention enters within this framework.

A first aspect of the invention relates to a method of integrity verification of public and private cryptographic key pairs in the additive group of integers modulo n, with n being the product of two prime numbers p and q, the method comprising the following steps:
  of computation (201), on the basis of said number n, of a public exponent e of said public key, and of a private exponent d of said private key, of two candidate factors p' and q' corresponding respectively to the numbers p and q,
  of verification (206) so as to verify the consistency of said private exponent with respect to said public exponent and to said number n, said verification step involving said candidate factors. A method according to the first aspect makes it possible to appreciably improve the reliability of the integrity tests, with optimal additional computation cost.

For example, said verification step pertains to the product of the public exponent e and of said private exponent d.

For example also, during said verification step, it is verified whether the product of the public exponent e and of said private exponent d is congruent to 1 modulo $\lambda'(n)$, the least common multiple between (p'−1) and (q'−1).

According to embodiments, during said verification step, it is verified whether the product of the public exponent e and of said private exponent d is congruent to 1 modulo the product $(p'-1)\cdot(q'-1)$.

For example, said verification step pertains to the least common multiple $\lambda(n)$ between (p−1) and (q−1).

For example also, during said verification step, the least common multiple $\lambda(n)$ between (p−1) and (q−1) is compared with the least common multiple $\lambda'(n)$ between (p'−1) and (q'−1).

According to embodiments, during said verification step, it is verified whether:
  the least common multiple $\lambda(n)$ between (p−1) and (q−1) is congruent to 0 modulo (p'−1), and
  the least common multiple $\lambda(n)$ between (p−1) and (q−1) is congruent to 0 modulo (q'−1).

Said candidate factors may for example be computed by a probabilistic factorization algorithm.

For example, the method is implemented in an electronic device in relation to a combination of side channel attack and of an attack by fault injection, said combination being implemented during the execution of a cryptographic method implementing a pair of cryptographic keys.

A second aspect of the invention relates to a method of testing security of an electronic device in relation to an attack, said device implementing a generation of a public cryptographic key e and a private cryptographic key d in the additive group of integers modulo n, such that:

n=p·q, with p and q being prime numbers,

1<e<Φ(n), with e and Φ (n) being mutually prime and Φ(n) (p−1)·(q−1), and d·e=1 mod λ(n), λ(n) being the least common multiple between p−1 and q−1, the method comprising a step of perturbation of the computation of the value λ(n), so as to obtain, instead of the value λ(n), a value λ'(n)=λ(n)/α, with α dividing λ(n), said perturbation leading to the computation of a private key d', instead of the private key d such that d'·e=1 mod λ(n)/α.

A method according to the second aspect makes it possible to test electronic devices implementing a generation of key pairs, by verifying their reaction in relation to the perturbation of the computation of the least common multiple.

A method according to the second aspect can be implemented in the industrial process of testing electronic devices implementing cryptographic key generation, for example in the test laboratory. Said perturbation step can make it possible to highlight a vulnerability in the resistance to an erroneous computation of the value λ(n).

A second aspect of the invention relates to a computer program as well as to a computer program product and a storage medium for such program and product, allowing the implementation of a method according to the first aspect when the program is loaded and executed by a processor of an electronic device, for example a cryptographic device.

A third aspect relates to an electronic device, for example a cryptographic device, configured for the implementation of a method according to the first aspect.

For example, a device according to the third aspect is a portable electronic entity.

The device according to the third aspect can be a chip card.

Other types of devices can be envisaged, especially security documents (electronic passport, electronic identity cards or the like), USE keys, mobile telephones or "smartphones".

BRIEF DESCRIPTION OF THE DRAWINGS

Other advantages, aims and characteristics of the present invention emerge from the detailed description which follows, given by way of nonlimiting example, in regard to the appended drawings in which.

DETAILED DESCRIPTION OF THE PREFERRED EMBODIMENTS

Hereinafter, embodiments are described. However, in a prefatory manner, there is described a method of testing integrity of generation of cryptographic key pairs. This test method can be used for cryptographic keys used in encryption and/or digital signature mechanisms. Thus, this method can be used even before knowing the subsequent use of the generated key pair.

It is assumed that a public cryptographic key (e, n) and a private cryptographic key (d, n) are generated such that:

n=p·q, with p and q being prime numbers,

1<e<Φ(n) and e and Φ (n) are mutually prime (gcd(e, Φ(n))=1), with Φ(n)=(p−1)·(q−1) (Φ being the Euler indicator function, or "totient" as it is termed), and d·e=1 mod λ(n), λ(n) being the least common multiple between p−1 and q−1 (λ(n)=lcm(p−1, q−1)).

Figure 1:
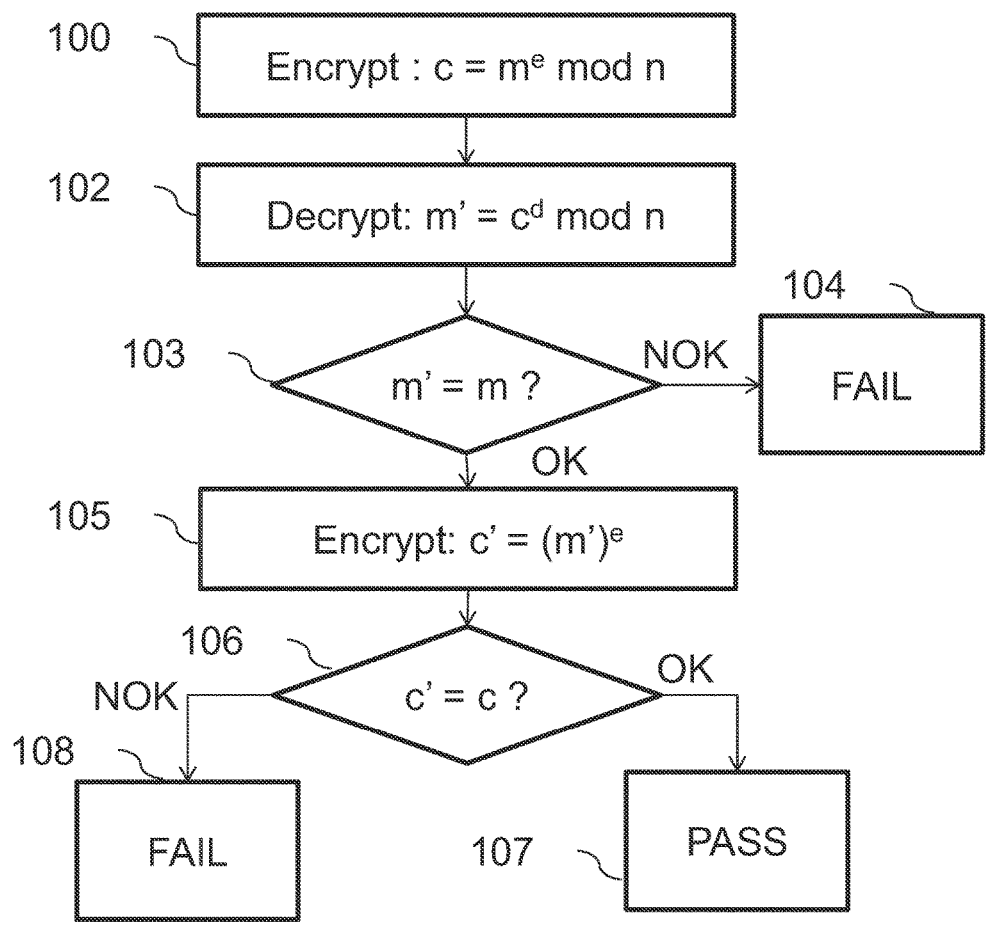
FIG. 1 illustrates a method of testing integrity of generation of keys.

Thereafter, as illustrated by FIG. 1, during a first step 100 a message m (m belonging to $Z_n$, the additive group of integers modulo n), is encrypted with the public exponent e so as to obtain a first encrypted message c=$m^e$ mod n. Thereafter, during step 102, the encrypted message c is decrypted with the private key d so as to obtain a decrypted message m'=$c^d$ mod n.

It is thereafter verified, during a step 103, whether the initial message m and the decrypted message are the same (m'=m). If this is not the case (NOK), it is determined during step 104 that the key pair generated is corrupted. If on the other hand the initial message m and the decrypted message are the same (OK), the decrypted message m' is encrypted, during a step 105, with the public exponent e so as to obtain a second encrypted message c'=$(m')^e$ mod n.

It is thereafter verified, during a step 106, whether the first encrypted message c and the second encrypted message c' are the same (c'=c). If such is the case (OK), it is determined during step 107 that the integrity test is successful. Otherwise (NOK), it is determined, during step 108, that the key pair generated is corrupted.

Certain corrupted key pairs may successfully pass the integrity tests such as that described hereinabove or other tests of the prior art.

For example, if, instead of generating the private exponent d, there is generated a number d' such that:

d'·e=1 mod λ(n)/α,

1≤α,

α divides λ(n), it may happen that for some messages, the key pair with the numbers d' and e passes the test successfully whereas an error has occurred in the private exponent d.

In addition to being a source of errors for a cryptographic system using the keys, this may be a source of attacks by malicious third parties.

For example, the number d' may be generated by error if the computation of the least common multiple of p−1 and q−1 (which must normally give λ(n)) is marred by an error. The number d' may be computed by implementing Euclid's algorithm. The integers a and b are computed so that e·a+b·λ(n)/α=1 (Bezout relation). The number d' is then obtained as d'=a mod λ(n)/α. Under these conditions, we do indeed have d'·e=1 mod λ(n)/α.

By causing the determination of the number d' instead of the number d, an attacker can thus retrieve one of the secret factors (p and q) of the number n such that n=p·q.

Indeed, let us assume that the integer a divides the number $$\frac{(q-1)}{gcd(p-1, q-1)}$$

without however dividing the number $$\frac{(p-1)}{gcd(p-1, q-1)},$$

then, denoting by t the number such that $$t = \frac{(q-1)}{\alpha \cdot gcd(p-1, q-1)},$$

we obtain $d = e^{-1} \bmod t \cdot (p-1)$.

Thus, the private exponent is the inverse of the public exponent in the ring $Z_{p-1}$ instead of the ring $Z_{\lambda(n)}$. For a random message m, we then have:

$(m^d)^e = m \bmod n,$ but we also have $(m^d)^e = m \bmod p.$

A multiple of the factor p can thus be obtained as $(m^d)^e - m \bmod n$.

An attacker can thus perturb the generation of keys and request the signature of random messages. For certain messages m, the signature s obtained is such that $gcd(s^e - m, n)$ gives a factor of n.

Let us assume that the least common multiple of p−1 and q−1 is computed as follows, $$\lambda(n) = \frac{(p-1) \cdot (q-1)}{gcd(p-1, q-1)},$$

with gcd(p−1, q−1) being the greatest common divisor of p−1 and q−1. If the computation of this greatest common divisor gives α. gcd(p−1, q−1) (the product of α times gcd(p−1, q−1)) instead of gcd(p−1, q−1), then d' is computed instead of computing d.

The inventors have noted that the integrity tests currently used might not detect certain errors when generating pairs of keys, especially during attacks such as mentioned hereinabove.

An attacker can cause errors in the computation of the private exponent by side channel observation of the operation of the device implementing the key generation and then by physical attack of the device so as to perturb this operation. The attacker may for example use lasers to perturb the device or else perturb the latter's electrical power supply.

By way of illustration, if an error a (such as mentioned hereinabove) is introduced so that the number a divides the value $k \cdot \lambda(n)/\alpha$ (k being an integer), and that the number d' is determined in place of the number d such that $d' \cdot e = 1 + k \cdot \lambda(n)/\alpha$ then an integrity test, such as for example defined in FIPS standard 140-2, executed on a message m of order s does not make it possible to detect the error if s divides $k \cdot \lambda(n)/\alpha$ whereas it does make it possible to detect it if s does not divide $k \cdot \lambda(n)/\alpha$. It is recalled that the order s of the message m in the additive group is the number of times that it is necessary to add together the message m to obtain 1.

Indeed, let e, p and q be RSA parameters with n=p·q. if $d' = e^{-1} \bmod \lambda(n)/\alpha$ is the erroneous exponent, the correct exponent being $d = e^{-1} \bmod \lambda(n)$, if d' is different from d then $\exists m \in Z_n^*$ such that $(m^e)^{d'} \neq m \bmod n$. Moreover, if $\forall m \in Z_n^*$ we have $(m^e)^{d'} = m \bmod n$ then d=d'. The proof of this is possible but is not presented here for the sake of conciseness.

Hereinafter, there is described a method making it possible to render the integrity tests sensitive to errors of this type. The integrity tests may be implemented during or after the generation of the keys.

Figure 2:
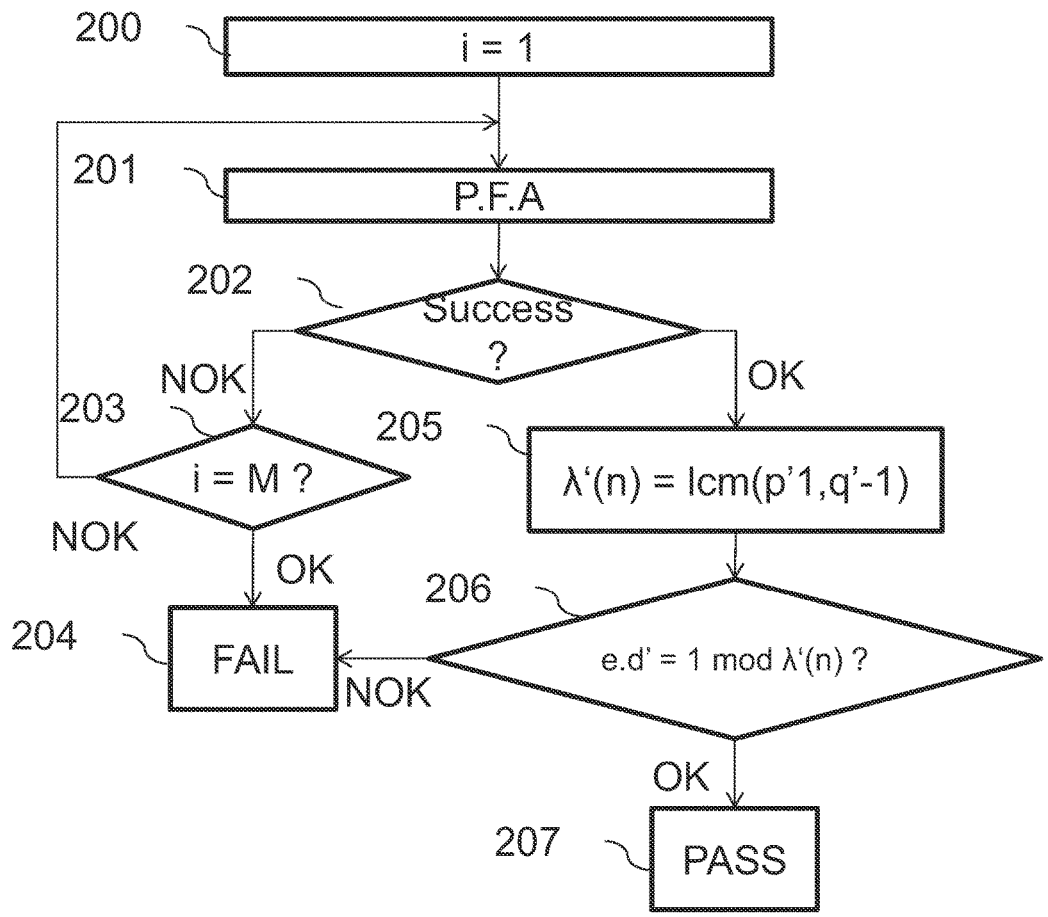
FIG. 2 illustrates a method of verifying integrity of keys.

With reference to FIG. 2, there is described a method of testing integrity of cryptographic key pairs which can be implemented when the prime numbers p and q on the basis of which the keys are generated are not known.

During a first step 200, a counter i is initialized to the value 1. Thereafter, a probabilistic factorization algorithm is implemented during a step 201. This algorithm makes it possible, on the basis of n (n=p·q), of the public exponent e of the public key and of d' the private exponent of the private key of which it is sought to know whether or not it is erroneous, to retrieve the prime factors p' and q' of n.

Once step 201 has been executed, it is determined during a step 202 whether it has made it possible to retrieve the numbers p and q.

If the execution of step 201 has not made it possible to determine these numbers (NOK), it is verified whether the counter i has reached the value M during step 203. The value M is a maximum number of times that the algorithm of step 201 should be executed. If the number M is reached (OK), it is determined during a step 204 that the pair of keys is corrupted. If on the contrary (NOK), the value M is not yet reached, step 201 is executed a new time.

Returning to step 202, if in step 201, it has been possible to determine the numbers p and q (OK), a step 205 is implemented during which the least common multiple λ'(n) of the numbers p'−1 and q'−1 is computed (λ'(n)=(p'−1)·(q'−1)).

Thereafter, it is tested during a step 206, whether the product e·d' is congruent to 1 modulo λ'(n) (e·d'=1 mod λ'(n)). If such is the case (OK), it is determined during step 207 that the pair of keys is not corrupted. Otherwise (NOK), the process goes back to step 204.

Alternatively, or in combination, there can be undertaken the comparison between λ'(n) and λ(n) to verify that λ'(n)=λ(n).

Alternatively, or in combination, it can moreover be verified whether λ(n) mod p'−1 and λ(n) mod q'−1 are both equal to 0.

In these alternatives, the value λ(n), computed on the basis of p and q is kept in memory and then read for the verifications.

Also alternatively, or in combination, the values p' and q' may be used to verify that e·d'=1 mod (p'−1)·(q'−1).

The search for the factors p and q of n may have a computational cost of the order of $O(u \cdot \log^3(n))$, typically for a probabilistic factorization algorithm. The probability of finding a factor of n after u trials is greater than or equal to $1 - 2^{-u}$. Thus, after ten trials, the probability of factorization is greater than or equal to 99.9%.

Once the factorization has been performed, the cost of the test of step 406 is dominated by the cost of computing the greatest common divisor implemented to compute the least common multiple (it is recalled that lcm (p'−1; q'−1)=(p'−1)·(q'−1)/gcd(p'−1, q'−1)).

Thus, the total cost of the method is of the order of $O(\log^3(n)) + O(\log^3(n)) = O(\log^3(n))$ for a probability of detection of greater than or equal to 99.9%. For its part, the cost of a conventional verification method is of the order of $O(\log^3(n))$ for a probability of detection of the order of 50% (experimental data).

Figure 3:
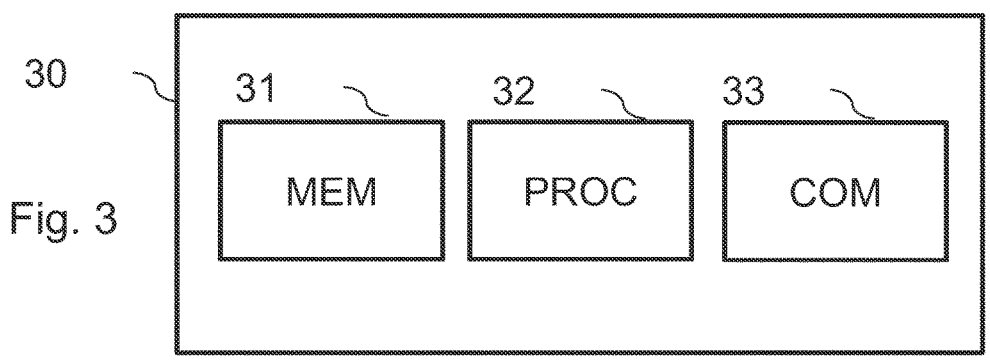
FIG. 3 schematically illustrates a device according to embodiments.

FIG. 3 schematically illustrates a device according to embodiments.

The device 30 of FIG. 3 comprises a memory unit 31 (MEM). This memory unit comprises a random-access memory for storing, in a non-enduring manner, computation data used during the implementation of a method in accordance with the invention, according to diverse embodiments.

The memory unit moreover comprises a nonvolatile memory (for example of the EEPROM type) for storing for example a computer program, according to an embodiment, for its execution by a processor (not represented) of a processing unit 31 (PROC) of the device.

The device moreover comprises a communication unit 33 (COM), for example for exchanging data with another device in accordance with embodiments. Data exchanges between devices may be realized according to the APDU protocol, the initials standing for "Application Protocol Data Unit", such as defined in ISO standard 7816 part 4.

The communication unit can thus comprise an input/output interface able to exchange according to this protocol. The data exchanged may be realized by APDU commands and responses to commands of this type.

A device according to embodiments may be in accordance with the standard ISO7816. It may for example be a chip card or a secure element.

A device according to embodiments is for example an integrated circuit.

The present invention has been described and illustrated in the present detailed description with reference to the attached figures. However, the present invention is not limited to the embodiments presented. Other variants, embodiments and combinations of characteristics may be deduced and implemented by the person skilled in the art on reading the present description and appended figures.

In the claims, the term "comprise" does not exclude other elements or other steps. The indefinite article "a" does not exclude the plural. A single processor or several other units may be used to implement the invention. The various characteristics presented and/or claimed may advantageously be combined. Their presence in the description or in different dependent claims does not in fact exclude the possibility of combining them. The reference signs should not be understood as limiting the scope of the invention.

The invention claimed is:

1. A method, performed by a processor of a cryptographic system, of cryptographically processing a message, using encryption and/or digital signature mechanisms based on public and private cryptographic key pairs in the additive group of integers modulo n, with n being the product of two prime numbers p and q, the method comprising:
   verifying the integrity of the public and private cryptographic key pairs; and
   encrypting and/or digitally signing the message using the public and private cryptographic key pairs,
   wherein the step of verifying of the integrity of the public and private cryptographic key pairs comprises the steps of
   computing, on the basis of said number n, a public exponent e of said public key, and of a private exponent d of said private key, of two candidate factors p' and q' corresponding respectively to the numbers p and q, and
   verifying a consistency of said private exponent with respect to said public exponent and to said number n, said verification step involving said candidate factors.

2. The method according to claim 1, wherein said verification step pertains to the product of the public exponent e and of said private exponent d.

3. The method according to claim 2, wherein during said verification step, it is verified whether the product of the public exponent e and of said private exponent d is congruent to 1 modulo $\lambda'(n)$, the least common multiple between (p'−1) and (q'−1).

4. The method according to claim 2, wherein during said verification step, it is verified whether the product of the public exponent e and of said private exponent d is congruent to 1 modulo the product (p'−1)·(q'−1).

5. The method according to claim 1, wherein said verification step pertains to the least common multiple $\lambda(n)$ between (p−1) and (q−1).

6. The method according to claim 5, wherein during said verification step, the least common multiple $\lambda(n)$ between (p−1) and (q−1) is compared with the least common multiple $\lambda'(n)$ between (p'−1) and (q'−1).

7. The method according to claim 5, wherein during said verification step, it is verified whether:
   the least common multiple $\lambda(n)$ between (p−1) and (q−1) is congruent to 0 modulo (p'−1), and
   the least common multiple $\lambda(n)$ between (p−1) and (q−1) is congruent to 0 modulo (q'−1).

8. The method according to claim 1, wherein said candidate factors are computed by a probabilistic factorization algorithm.

9. A computer program encoded on a non-transitory computer-readable medium, comprising instructions that, upon being loaded and executed by a processor of a cryptography device, causes the cryptography device to implement the method according to claim 1.

10. A cryptographic device comprising a microprocessor configured to implement the method according to claim 1.

11. The cryptographic device according to claim 10, wherein the cryptographic device is portable.

* * * * *